United States Patent
Ubillos

(12) 
(10) Patent No.: US 6,892,353 B1
(45) Date of Patent: May 10, 2005

(54) EDIT TO TAPE

(75) Inventor: Randy Ubillos, Cupertino, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/285,934

(22) Filed: Apr. 2, 1999

(51) Int. Cl.$^7$ .................................................. G06F 6/00
(52) U.S. Cl. ...................................... 715/727; 715/728
(58) Field of Search ................................ 715/727, 728, 715/730, 716, 700, 765, 744, 839, 723, 768, 746

(56) References Cited

U.S. PATENT DOCUMENTS

| | | | | |
|---|---|---|---|---|
| 5,206,929 A | * | 4/1993 | Langford et al. | 345/839 |
| 5,682,326 A | * | 10/1997 | Klingler et al. | 348/564 |
| 5,706,457 A | * | 1/1998 | Dwyer et al. | 345/839 |
| 5,999,938 A | * | 12/1999 | Bliss et al. | 707/102 |
| 6,011,553 A | * | 1/2000 | Komiyama | 345/839 |
| 6,144,991 A | * | 11/2000 | England | 345/764 |
| 6,363,204 B1 | * | 3/2002 | Johnson et al. | 725/133 |
| 6,426,778 B1 | * | 7/2002 | Valdez, Jr. | 348/461 |

* cited by examiner

Primary Examiner—Cao (Kevin) Nguyen
(74) Attorney, Agent, or Firm—Blakely, Sokoloff, Taylor & Zafman LLP

(57) ABSTRACT

A method and apparatus is described that allows edited media to be recorded to a sequential storage device. An edited time based stream of information of a source media is displayed. The edited time based stream is transferred to a sequential storage device to be recorded using an icon where the icon represents a function to be performed on the storage device.

39 Claims, 4 Drawing Sheets

EDIT TO TAPE

BACKGROUND

I. Field of the Invention

The present invention relates to media editing. In articular, the present invention relates to transferring edited media to a sequential storage device.

II. Background

Editing is generally the art of making subtle adjustments to a material or materials in a form that communicates a message with maximum impact. In the area of video editing, the editor defines and shapes the video and/or audio until the message to be delivered is accomplished. Generally, video editing may be divided into two categories linear video editing and non-linear video editing. In linear video editing, the images are taken in a sequential order. Stated differently, one idea after another must be previously conceived and then, the video is taken in the conceived chronological sequence. For example, suppose a video is to be taken of an office, the editor must first conceptualize as to what the scenes would be and in which sequence. The editor may want to take a video of an entry into the Office. This scene perhaps followed by a focus on a pot plant in a corner. The scene may then move to the various articles on a desk and then, the scene shifting its focus to a window. In linear video editing, this is the precise sequence the video must be taken.

By contrast, in non-linear video editing, scenes may be taken in any order and later edited according to a desired sequence. Whether linear video editing or non-linear video editing approach is to be taken generally depends on the video system that is to be used. While non-linear video editing system may be more complicated, the advantage is that the video may be taken in any sequence and later, through careful observation of the video and a thoughtful process, the video may be manipulated to communicate the message in the manner the editor wishes to convey with maximum impact. Due to its free format, the editor can readily impute creativity without being constrained physically.

With the advancement of computer technology, further improvements have been made to the video editing system through a process called digitization. In particular, the digitization of video has had a profound impact on non-linear video editing system. Previously, copies of a film containing the video would be made. By cutting and splicing the copies, an edited version of the original film was made. If the editor was not satisfied, further copies of the original film were made and the cutting and splicing would resume until a desired product was obtained. In a digital video editing system, video is stored in a storage medium such as magnetic discs or laser discs thereby allowing the video to be retrieved randomly and displayed on a display device such as a monitor. This alleviates the burdensome technique of cutting and splicing. Further, in random access, each image of the video operates independently, thus, it is possible to retrieve a particular image without sequentially going through other materials to reach the image. Examples of sequential access would be films or magnetic tapes. By allowing images to be accessed randomly, video can be easily manipulated into any desired sequence which is the heart of a non-linear video editing system.

In certain instances, it is desirable to record the edited video and/or audio clips onto a tape. A clip generally defines movies, still images, nested sequences, video files and audio files. The recorded tape could be mass duplicated for distribution using conventional tape duplicating machines or the tape could serve as a permanent record for the edited clips. With the advent of powerful processors such as those to be described later, it is now possible to perform edit to tape process within the video editing system itself. However, if the edit to tape process requires too much effort on the part of the editor, the feature distracts the editor during editing. In a known method, the editor manually calculates each and every start and end points of the video and/or audio clips at a source calculates every corresponding start and end destination. It is desirable to provide a em that is easy to use and does not burden the

SUMMARY

A method and apparatus is described that allows edited media to be recorded to a sequential storage device. An edited time based stream of information of a source media is displayed. The edited time based stream is transferred to a sequential storage device to be recorded using an icon where the icon represents a function to be performed on the storage device.

Other features and advantages of the present invention will be apparent from the accompanying drawings and detailed description to be followed.

BRIEF DESCRIPTION OF THE DRAWINGS

The present invention is illustrated by way of examples and not as limitations in the figures of the accompanying drawings in which.

DETAILED DESCRIPTION

Figure 1A:
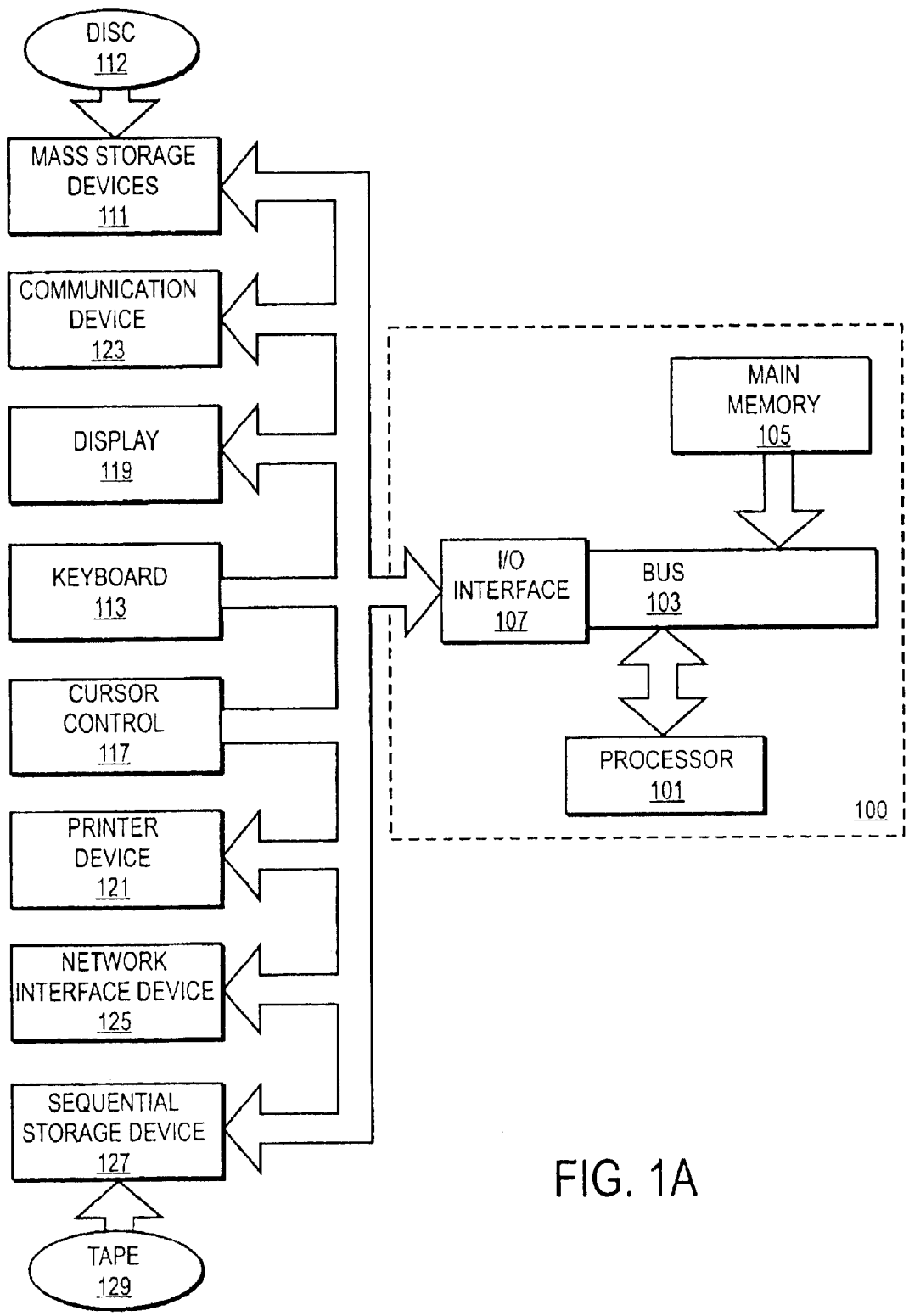
FIG. 1a is a diagram of a computer system that may contain an embodiment of the invention.

FIG. 1a is an example of a computer system 100 in which an embodiment of the invention may be incorporated. The computer system 100 comprises a processor 101 coupled to a main memory 105 via a bus 103. The main memory 105 may be dynamic random access memories (DRAMs) or other suitable memories. Data and instructions are stored in the main memory 105 which are processed by the processor 101. Generally, coupled to the bus 103 is a read only memory (ROM) in which the basic input/output instructions (BIOS) are stored. Further coupled to the bus 103 are various controllers such as memory management unit (MMU), interrupt controller, video controller, direct memory access controller (DMA) and input/output(I/O) controller, among others, all which are not shown in the figure. Further coupled to the bus 103 is an I/O interface 107 to which the various I/O devices are coupled to. Examples of the I/O devices are mass storage devices 111 such as magnetic disc drives and/or optical disc drives, an alphanumeric input device 113 such as a keyboard, a cursor control device 117 such as a mouse or a trackball, a display device 119 such as a monitor or a liquid crystal display (LCD), a printer device 121 such as a printer, a communication device 123 such as a modem and a network interface device 125 such as ethernet.

Additionally, a sequential storage device 127 such as a video tape deck or a video camcorder is coupled to the computer through the I/O controller 107. For example, the sequential storage device 127 can be connected through the printer port, modem port, or Apple FireWire port. Below is a list of deck protocols that may be used:

Apple® FireWire
Apple® FireWire Basic
JVC® RS-232
Pariasonic® RS-232
SonyD RS-422
Sony® RS-232
Sony® VISCA
Sony® LANC Using the video tape deck as an example, the video tape deck 127 stores edited video clips and/or accompanying audio clips in a video tape 129 formatted in accordance with an embodiment of the invention. In its one format, the video tape 129 may be in "Black and Code". Black and Code defines a format in which the video tape is written with black pictures with no sound and throughout the tape, timecodes are inserted. Timecodes allow the video tape deck 127 to keep track of the various positions within a tape thereby allowing quick and fast navigation through the tape. Generally, the video tape deck 127 is controlled in a manner such that when a clip is being recorded, the tape head backs up to a certain distance and rolls forward to synchronize with the last frame using the timecode and starts recording. In this manner, an unsightly gap between the clip and the last frame recorded is not formed. Thus, between the two recorded clips, it is perceived as being one continuous clip.

Figure 1B:
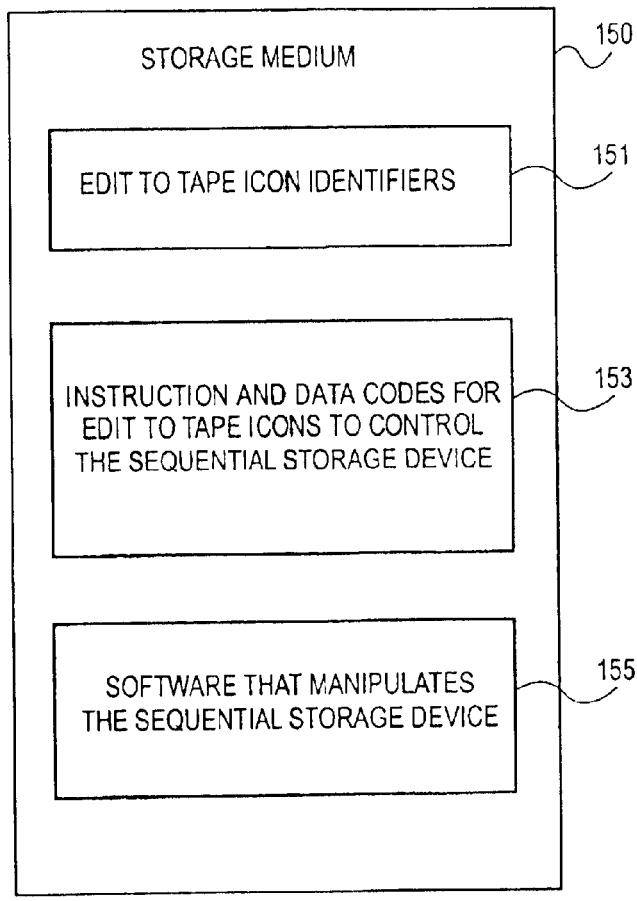
FIG. 1b is a diagram of a storage medium that may contain an embodiment of the invention.

The computer system 100 described above is readily available commercially. Preferably, The computer system 100 be one of the Macintosh® family of personal computers such as the Macintosh® Quadram, Macintosh® Performa™, PowerMac® brand personal computers manufactured by Apple Computer®, Inc. of Cupertino, Calif. The processor can be one of the Power PC family of microprocessors such as the 604 or G3 PowerPC® such as those manufactured by Motorola®, Inc. of Schaumburg, Ill. However, other systems and processors may be used. Generally, the present invention may be stored in a mass storage device 111 or a storage disc 112, which may be magnetic or optical, until such time the processor 101 retrieves from storage and down loads into the main memory 105 for processing. FIG. 1b is an example of a storage medium 150 which may be random access memory (RAM), hard disk, compact disc and/or magnetic disc, among others. The storage medium 150 comprises edit to tape icon identifiers 151, instruction and data codes 153 for edit to tape icons to control the sequential storage device connected to the computer system and software 155 that manipulates the storage device under control of the edit to tape icons.

Processor 101 processes the data and instructions from the main memory 105. Command selections and information to direct the flow of data and instructions to the processor 101 may be performed by a user via the alphanumeric device 113 and/or cursor control device 117 or voice recognition. The processor 101 processes the data and instructions and the results may be displayed on a display device 119.

Figure 1C:
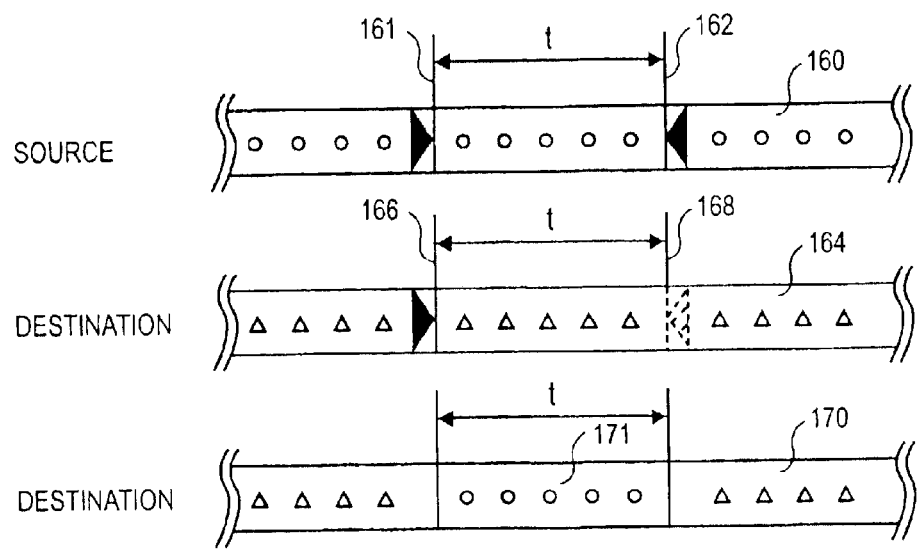
FIG. 1c illustrates an example of a three point editing.

FIG. 1c illustrates an example of a three point editing to aid in the understanding of the invention. Three point editing is a method in which three editing points are selected between a source and a destination. At the source, a start point 161 (also referred to as in point) and an end point 162 (also referred to out point) are selected on a source media 160 constituting the edited source media. At the destination media, an in point 166 is selected which is used to define the start point of the transferred edited source media to be inserted at the destination media. Because the time duration t between the source in point 161 and the source out point 162 does not change during the transfer, the destination out point position 168 can be calculated from the selected destination in point 166 and the time duration t of the source in and out point. At the destination media 170, the edited source media 171 has been inserted. Of course, this is but one form of three point editing and other forms of three point editing can be derived from the example above.

Figure 2:
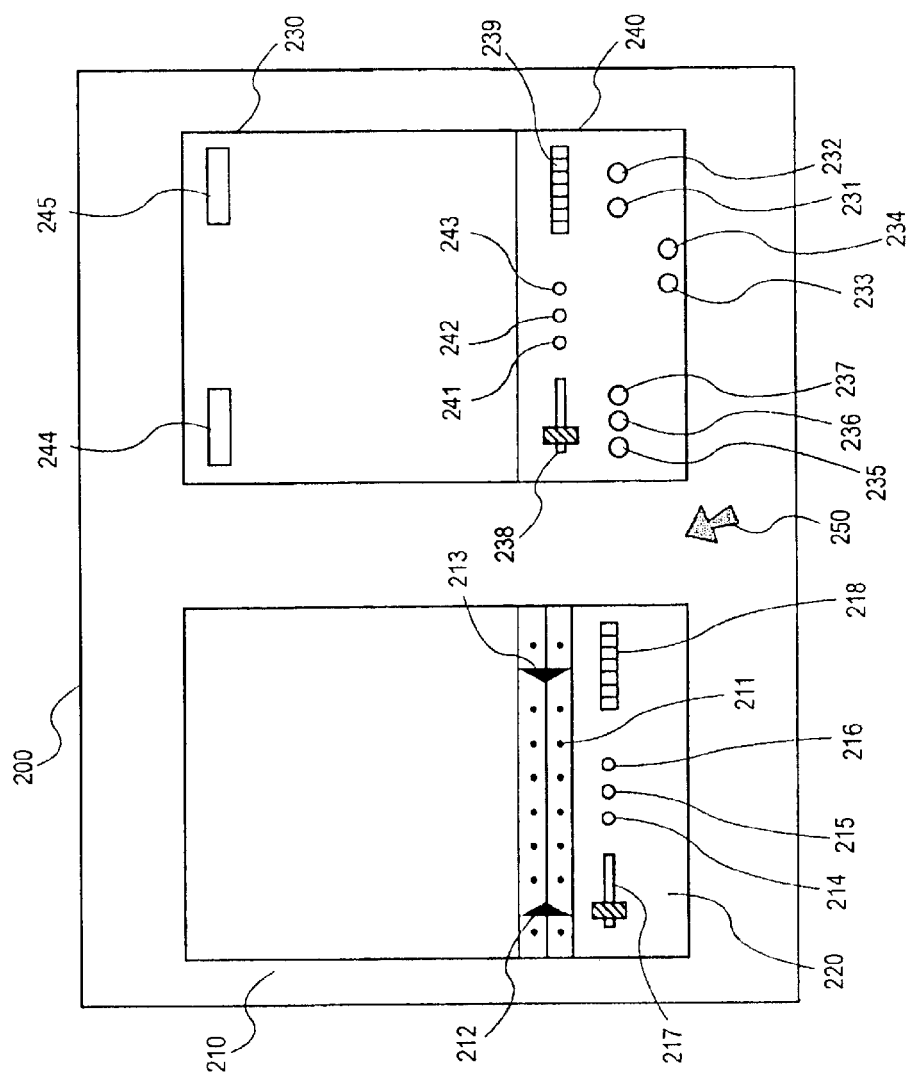
FIG. 2 is a diagram of a Graphics User Interface (GUI) that may be used with an embodiment of the invention.

FIG. 2 is an example of a graphics user interface (GUI) 200 that maybe used with an embodiment of the invention. However, other user interfaces may be used according to a desired result by the designer. The GUI 200 is displayed on a display device 119 (See FIG. 1a) and aids the user in controlling the flow of data and instructions to the processor 101. Typically, the GUI 200 comprises one or more windows, some which may be opened by the processor 101 in accordance with data and instructions and some which may be opened by the user. The figure illustrates two windows 210, 230. Window 210 is a viewer that performs as a source monitor in which various clips containing time based stream of information can be loaded. The loaded time based stream of information can be, but not limited to, a plurality of video clips, a plurality of video and audio clips, or a plurality of audio clips. Once loaded in the window 210, editing can be performed on the time based stream of information using a control panel 220 located at the bottom of the window 210. The control panel 220 comprises a timeline 211 wherein the timeline keeps track of the chronological sequence of loaded time based stream of information. The timeline 211 includes two edit pointers 212, 213 that are used to select the in point and the out point of the time based stream of information which constitutes an edited time based stream of information to be transferred to a destination.

The manipulation of the edit pointers 212, 213 can be performed by the pointing arrow 250. The pointing arrow 250 is operated by the user through the I/O device such as the cursor control device 117 (e.g., a mouse or a trackball) or the alphanumeric device 113 or by speech recognition. For example, the user can manipulate individually the position of the edit pointers 212, 213 by placing the pointing arrow 250 on the edit pointer desired to be moved; holding down a button located on the mouse, dragging the pointer to the desired position; and releasing the button.

The control panel 220 of the above example further comprises a play icon 215, a reverse icon 214, and a forward icon 216. These icons are used to play the time based stream of information or move the position of the playhead backward or forward within the timeline 211. The control panel 220 also comprises a jog control icon 218 to jog one frame at a time and a shuttle control 217 that adjusts the frame speed of the video.

The second window 230 is an edit to tape window which allows the edited time based stream of information to be transferred to a tape. At the bottom of the second window 230 is a second control panel 240 that interfaces with the video tape deck 127 connected to the computer. The control panel 240 comprises a play icon 242, a reverse icon 241, and a forward icon 243 used to play a time based stream of information of the video tape deck 127 or move the position of the playhead backward or forward. By manipulating the icons 241, 242 and 243, the video contained in the video tape deck 127 can be viewed at the window 220 and/or its audio can be heard in a speaker coupled to the computer. In one embodiment, the icons 241, 242, 243 manipulate a copy of the video and/or audio recorded in the video tape deck 127 that was previously stored in the main memory 105. In this manner, the video tape deck 127 need not actually come into operation until a video clip and/or an audio clip is to be recorded.

On the upper left and right corners of the window 230 are a plurality of timecode indicators 244, 245 which in one embodiment can be used to position the playhead of the video tape deck 127 on the video tape 129. Timecode allows for fast and accurate navigation through the tape deck 127. The timecode indicators 244, 245 can be used to indicate in and out points for retrieval of a recorded clip in the tape deck 127 onto the main memory 105. In one embodiment, the upper left timecode indicator 244 displays a duration of clip to be displayed and/or heard. The upper right timecode indicator 245 displays the current playhead position. The timecode contained in the upper right timecode indicator 245 can be changed by entering a new timecode in the indicator 245. In one embodiment, the timecode has the following format:

Hours; Minutes: Seconds: Frames

Thus, entering 01451609 sets the time code to 01: 45: 16: 09.

Note that the format is accurate to a frame and thus, the playhead is able to navigate and be positioned at a particular frame. In one embodiment, one second is made equivalent to thirty frames. In this instance, entering fifty-five in the frame column causes the timecode indicator 245 to automatically adjust the format to one second and fifteen frames.

The control panel 240 also comprises a mark in icon 233 and a mark out icon 234 which can be used to select an in point and an out point on a clip that is displayed on the second window 230. The selected in point or the out point can be used as one of the three edit points in the three point editing described above. Selecting the in point or the out point causes the playhead to be positioned to the selected in point or a calculated in point if the out point was selected. The control panel 240 further comprises video icon 231 and audio icon 232 to select which media is to be recorded by the video tape deck 127. For example, selecting the video icon 231 causes only the edited video clip to be recorded on the tape deck. Likewise, selecting the audio icon 232 causes only the edited audio clip to be recorded on the tape deck. If both icon 231, 232 are selected, both the video and audio sequence are recorded in the tape deck. Similar to the control panel 220, the control panel 240 also comprises a jog control icon 239 to jog one frame at a time and a shuttle control icon 238 that adjusts the frame speed of the video.

The control panel 240 further comprises a plurality of icons 235, 236, 237 in accordance with an embodiment of the present invention. Each icon represents an interaction with the video tape deck in a manner defined by the function of the icon. According to the embodiment three icons are displayed. The icon 235 represents an insert edit; the icon 236 represents an assembly edit; and the icon 237 represents a preview edit. The functions represented by the icons are described below:

Insert editing: Insert editing is a form of an overwrite editing in which the edited source media is inserted at an in point of a destination media which is the position of the playhead. Overwrite editing is an editing where the edited source media replaces the current destination media by an equal length of the edited source media. One feature of the insert editing is that the original timecode encoded on the tape remains preserved.

Assembly editing: Assembly editing is a form of an overwrite editing in which the edited source media is inserted at an in point which is the position of the playhead. The difference between the insert editing and the assembly editing is that the assembly editing overwrites the existing timecode on the tape.

Preview: Preview simulates the insert to tape operation but nothing is actually recorded on the tape. The feature gives the editor a preview of the edit to tape operation before the actual recording takes place.

The edit to tape operations can be performed using various methods. In one method, the steps comprise selecting three points using three point editing, dragging the edited source media to the edit to tape window using the pointing arrow 250 and placing it there which activates a default icon. The default icon can be one of the inserting editing icon 235, assembly overwrite editing icon 236 or preview editing icon 237. In another method, once the three points in the three point editing have been selected, dragging the edited source media using the pointing arrow 250 to one of icons 235, 236, 237 which activates that icon. In yet another method, once the three points in the three point editing have been selected, clicking one of the icons 235, 236, 237 using the pointing arrow 250 which activates that icon. the list of methods that may be used to activate the edit to tape icons 235, 236, 237 described above should not be construed as limitations but as examples.

Note that the two window systems described above, is but one embodiment. In another embodiment, the source media has been already edited and stored in a file, for example, which is represented as a file icon. By dragging the file icon to the edit to tape window or using the various methods described immediately above, the edited source media is recorded onto the tape.

Figure 3:
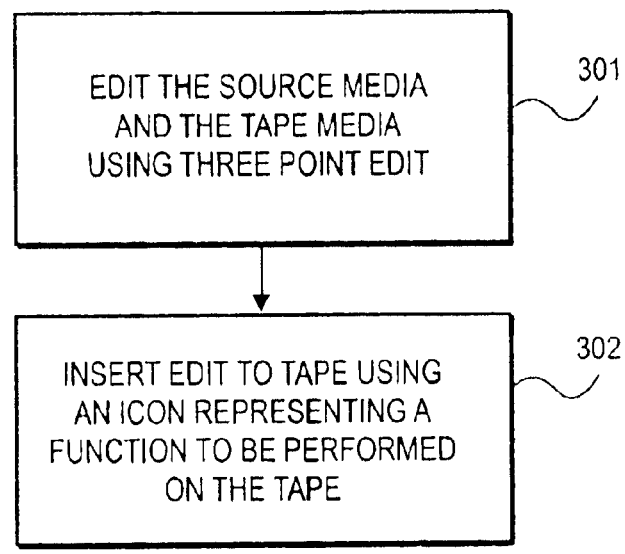
FIG. 3 is a flowchart of an embodiment of the invention.

FIG. 3 is a flowchart in accordance with an embodiment of the invention. In block 301, three point editing is performed between the source media and the tape media. In block 302, insert edit to tape is performed using an edit to tape icon that represents a function to be performed on the tape.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than a restrictive sense.

What is claimed is:

1. A method comprising:
    displaying an indicia of a time based stream of information of a source media;
    editing said time based stream using at least one edit point; and
    transferring said edited time based stream to a sequential storage device using an icon, wherein said icon represents a function to be performed on said sequential storage device.

2. A method as in claim 1, wherein said editing comprises a three point editing between said source media and a destination media.

3. A method as in claim 1, wherein transferring said edited time based stream comprises:
    transferring said edited time based stream to a portion of a window, said window having at least one icon;
    said icon performing a function on said sequential device by default.

4. A method as in claim 1, wherein transferring said edited time based stream comprises:
    transferring said edited time based stream to said icon, said icon performing said function on said sequential device.

5. A method as in claim 1, wherein transferring said edited time based stream comprises: clicking said icon with a cursor control device, said icon performing said function on said sequential device.

6. A method as in claim 1, wherein said function is one of an insert edit, an assembly edit and a preview edit.

7. A method as in claim 1, further comprising:
black and coding a tape contained in said sequential device.

8. A method as in claim 1, further comprising:
using a timecode indicator to position a playhead of said sequential storage device.

9. A method as in claim 1, further comprising:
using one of a mark in icon and a mark out icon to position a playhead of said sequential storage device.

10. An apparatus comprising:
a display device to display an indicia of a time based stream of information of a source media;
means for editing said time based stream using at least one edit point;
at least one icon displayed on said display device, wherein said icon represents a function to be performed on a sequential storage device; and
means for transferring said edited time based stream to said sequential storage device using said icon.

11. An apparatus as in claim 10, wherein said editing means includes means for performing a three point editing between said source media and a destination media.

12. An apparatus as in claim 10, further comprising:
means for insert editing said edited time based stream to said sequential storage device using said icon.

13. An apparatus as in claim 12, wherein said insert editing means is a processor executing a sequence of instructions.

14. An apparatus as in claim 10, further comprising:
means for assembly editing said edited time based stream to said sequential storage device using said icon.

15. An apparatus as in claim 14, wherein said assembly editing means is a processor executing sequence of instructions.

16. An apparatus as in claim 10, further comprising:
means for preview editing said edited time based stream using said icon.

17. An apparatus as in claim 16, wherein said preview editing means is a processor executing a sequence of instructions.

18. An apparatus as in claim 10, wherein said sequential device further comprising:
a tape having a black and code format.

19. An apparatus as in claim 10, further comprising:
means for positioning a playhead of said sequential storage device.

20. An apparatus as in claim 19, wherein said positioning means is a timecode indicator.

21. An apparatus as in claim 19, wherein said positioning means is one of a mark in icon and a mark out icon.

22. An apparatus as in claim 10, wherein said editing means is a cursor control device.

23. An apparatus as in claim 10, wherein said transferring means is a cursor control device.

24. A system comprising:
a computing device;
a display device to display an indicia of a time based stream of information of a source media;
at least one icon displayed on said display device, wherein said icon represents a function to be performed on a sequential storage device; and
said computing device including a first circuitry configured to edit said time based stream using at least one edit point, and
a second circuitry configured to transfer said edited time based stream to said sequential storage device using said icon.

25. A system as in claim 24, wherein said first circuitry includes a third circuitry configured to perform a three point editing between said source media and a destination media.

26. A system as in claim 24, further comprising:
a fourth circuitry configured to insert edit said edited time based stream to said sequential storage device using said icon.

27. A system as in claim 24, further comprising:
a fifth circuitry configured to assembly edit said edited time based stream to said sequential storage device using said icon.

28. A system as in claim 24, further comprising:
a sixth circuitry configured to preview edit said edited time based stream using said icon.

29. A system as in claim 24, wherein said sequential device further comprising:
a tape having a black and code format.

30. A system as in claim 24, further comprising:
a seventh circuitry configured to position a playhead of said sequential storage device.

31. A machine readable medium having stored thereon data representing sequences of instructions, which when executed by a computer system, cause said computer system to perform a method comprising:
displaying an indicia of a time based stream of information of a source media;
editing said time based stream using at least one edit point; and
transferring said edited time based stream to a sequential storage device using an icon, wherein said icon represents a function to be performed on said sequential storage device.

32. A machine readable medium as in claim 31, wherein said editing comprises a three point editing between said source media and a destination media.

33. A machine readable medium as in claim 32, wherein transferring said edited time based stream comprises:
transferring said edited time based stream to a portion of a window, said window having at least one icon;
said icon performing a function on said sequential device by default.

34. A machine readable medium as in claim 32, wherein transferring said edited time based stream comprises:
transferring said edited time based stream to said icon, said icon performing said function on said sequential device.

35. A machine readable medium as in claim 32, wherein transferring said edited time based stream comprises:
clicking said icon with a cursor control device, said icon performing said function on said sequential device.

36. A machine readable medium as in claim 32, wherein said function is one of an insert edit, an assembly edit and a preview edit.

37. A machine readable medium as in claim 32, further comprising:
black and coding a tape contained in said sequential device.

38. A machine readable medium as in claim 32, further comprising:
using a timecode indicator to position a playhead of said sequential storage device.

39. A machine readable medium as in claim 32, further comprising:
using one of a mark in icon and a mark out icon to position a playhead of said sequential storage device.

* * * * *